United States Patent
Gore (10) Patent No.: US 10,754,442 B2
(45) Date of Patent: Aug. 25, 2020

(54) FILMS OR SURFACES INCLUDING POSITIONAL TRACKING MARKS

(71) Applicant: YewSavin, Inc., Fort Collins, CO (US)

(72) Inventor: Makarand Prabhakar Gore, Fort Collins, CO (US)

(73) Assignee: YewSavin, Inc., Fort Collins, CO (US)

( * ) Notice: Subject to any disclaimer, the term of this patent is extended or adjusted under 35 U.S.C. 154(b) by 571 days.

(21) Appl. No.: 15/206,197

(22) Filed: Jul. 8, 2016

(65) Prior Publication Data

US 2017/0123512 A1    May 4, 2017

Related U.S. Application Data

(60) Provisional application No. 62/190,592, filed on Jul. 9, 2015.

(51) Int. Cl.
*G06F 3/03*       (2006.01)
*G06F 3/0354*   (2013.01)

(52) U.S. Cl.
CPC ........ *G06F 3/0317* (2013.01); *G06F 3/03542* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,342,575 | B1* | 3/2008 | Hartwell | G06F 3/03545 178/19.05 |
| 9,110,235 | B2* | 8/2015 | Nakajima | G02B 5/128 |
| 2002/0148655 | A1* | 10/2002 | Cho | G06F 3/03542 178/18.09 |
| 2003/0016368 | A1* | 1/2003 | Aman | G02B 5/128 356/615 |
| 2005/0156915 | A1* | 7/2005 | Fisher | G06F 3/0317 345/179 |
| 2006/0078866 | A1* | 4/2006 | Marggraff | G06F 3/0321 434/353 |
| 2007/0125937 | A1* | 6/2007 | Eliasson | G06F 3/0414 250/221 |
| 2009/0015548 | A1* | 1/2009 | Tazaki | G06F 3/0308 345/156 |
| 2009/0279170 | A1* | 11/2009 | Miyazaki | G02B 5/3025 359/485.01 |
| 2010/0001962 | A1* | 1/2010 | Doray | G06F 3/0317 345/173 |
| 2010/0008028 | A1* | 1/2010 | Richardson | G06F 1/1626 361/679.01 |
| 2011/0115750 | A1* | 5/2011 | Ebner | G06F 3/042 345/175 |
| 2012/0056807 | A1* | 3/2012 | Chapman | G06F 3/0428 345/158 |
| 2012/0300306 | A1* | 11/2012 | Nagahama | G02B 1/118 359/601 |

(Continued)

*Primary Examiner* — Temesghen Ghebretinsae
*Assistant Examiner* — Sosina Abebe
(74) *Attorney, Agent, or Firm* — Toering Patents PLLC (57) ABSTRACT

Various implementations of the invention comprise a surface or film having a plurality of three-dimensional structures embodied on or within the surface or film, each of the three-dimensional structures having a reflecting surface configured to retro-reflect radiation from a radiation source back to a detector located at the radiation source.

20 Claims, 11 Drawing Sheets

(56) References Cited

U.S. PATENT DOCUMENTS

| | | | |
|---|---|---|---|
| 2014/0264034 A1* | 9/2014 | Cui | G06F 3/0416 |
| | | | 250/341.8 |
| 2014/0267191 A1* | 9/2014 | Takahara | H01L 27/323 |
| | | | 345/179 |

* cited by examiner

FILMS OR SURFACES INCLUDING POSITIONAL TRACKING MARKS

CROSS-REFERENCE TO RELATED APPLICATIONS

This Application claims priority to U.S. Provisional Patent Application No. 62/190,592, filed on Jul. 9, 2015, and entitled "Films including Positional Tracking Marks."

FIELD OF THE INVENTION

The invention is generally related to films and/or surfaces that include retro-reflective, uniquely defined positional tracking marks and more particularly, to using such films and/or surfaces as a human/digital interface.

BACKGROUND OF THE INVENTION

Digital-human interfaces (e.g., user interfaces) that provide closer to real life experiences are desired as digital devices evolve. Writing and drawing with human hands are fundamental processes for experience and expression. Existing devices that use touch sensitive screens are not precise enough to reproduce such experience or expression with sufficient accuracy. For example, a typical line width of a pen or pencil is 0.5 mm, and no screen technology available today sufficiently reproduces the handwriting experience at a reasonable cost. Some commercially available digitizing systems utilize position-dependent two-dimensional dots that are detected by sensor in a pen such as that available from Anoto Group AB.

Devices such as capacitive or resistive touch screens provide both input (touch) and output (display) capabilities. A touch screen is formed by placing a transparent overlay proximate to the display surface. Such overlays typically detect input (i.e., a "touch") based upon a change in electrical properties of the overlay. The accuracy and resolution of these overlays is typically insufficient for precision writing, drawing, marking, etc., to provide a rewarding user experience. Existing systems that do provide the expected level of accuracy and resolution in touch (hand or writing instrument) frequently require unacceptably high background in the visual perception.

Other existing devices utilize a pen that includes a radiation source and a camera, to be used on visual devices such as display or screen for human-digital interface. These pens rely on tiny ink dots on the surface of the display. These ink dots, which are not transparent, block light from the underlying display and in effect, degrade the intensity of the display. Other existing devices rely on photo luminescent marks disposed on a surface; however, the intensity of fluorescence is not sufficient for a practical device. Other existing devices that use reflection (specular reflection) are not useful for handwriting applications because the angle of incidence needs to be nearly the same as the angle of reflection for the pen to detect the marks.

SUMMARY OF THE INVENTION

Various implementations of the invention comprise a surface or film that includes retro-reflective, uniquely defined positional tracking marks useful in connection with a human/digital interface. In some implementations of the invention, the surface or film includes three-dimensional structures (referred to herein as "marks") embodied onto or into the surface or films that are detectable by electronic devices in invisible portions of the electromagnetic spectrum. In some implementations of the invention, the surface or film selectively reflects a portion of the electromagnetic spectrum. In some implementations of the invention, the film is transparent (or substantially transparent) to visible portions of the electromagnetic spectrum. In some implementations of the invention, the film is comprised of multiple layers.

In various implementations of the invention, the surface or film, and the marks embodied therein, is comprised of extremely durable materials. In various implementations of the invention, neither the surface/film, nor the marks embodied therein, visually impair digital display screens or other surfaces on which the films may be overlaid.

According to various implementations of the invention, these surfaces or films provide invisible tracking and digitization of information generated through motion of a stylus on screens and protective surfaces.

DETAILED DESCRIPTION

The various implementations of the invention may be understood more readily by reference to the following description in connection with the accompanying figures and examples, which form a part of this disclosure. This invention is not limited to the specific devices, methods, applications, conditions or parameters described and/or shown herein, and the terminology used herein is for the purpose of describing particular implementations by way of example only and is not intended to be limiting of the claimed invention. In addition, as used in the specification including the claims, the singular forms "a," "an," and "the" include the plural, and reference to a particular numerical value includes at least that particular value, unless the context clearly dictates otherwise. The term "plurality", as used herein, means more than one. When a range of values is expressed, another implementation includes from the one particular value and/or to the other particular value. Similarly, when values are expressed as approximations, by use of the antecedent "about," it will be understood that the particular value forms another implementation. All ranges are inclusive and combinable.

Various implementations of the invention are now described in the context of a film that may be overlaid onto another surface (e.g., a surface of a computer display, a surface of a mobile device display, a surface of another display, and/or other surfaces). However, the invention is not limited to such films, but includes surfaces more generally. For example, the three-dimensional structures (i.e., marks) described herein may be incorporated directly onto or into a surface itself (i.e., without a film with such structures overlaid onto the surface). So while various implementations of the invention are described as films, such implementations apply equally to surfaces themselves as would be appreciated.

Various implementations of the invention comprise a transparent film with various marks embodied therein that are configured to interact with a pen or stylus having a radiation source (e.g., light) and a detector. According to various implementations of the invention, the marks embodied in the film reflect radiation back to its source (e.g., a pen or other writing stylus) when used at a typical handwriting angle of 30°-60° (i.e., an acute angle formed between the pen and the writing surface). Such marks are said to "retro-reflect" radiation back to the source of the radiation, that is, so that the path of the reflected radiation is substantially parallel to, though in the opposite direction of, the path of the incident radiation. More particularly, the mark comprises a three-dimensional structure embodied in or on the film, and a surface of such three-dimensional structure retro-reflects at least a selected band of radiation back to its source. Conventional printed marks generally used in conventional reading are not considered three dimensional because the height or thickness of such marks is substantially less than the dimension in width or length (e.g., the smallest dimension of such printed marks is less that 15% of the other dimensions of the mark). According to various implementations of the invention, the smallest dimension of a three dimensional mark is at least 20% of the other two dimensions of the mark. For purposes of this description, a "retro-reflector" refers to a surface that reflects radiation so that at least a portion of rays from a source and incident to the surface (i.e., "incident rays") are reflected back as reflected rays along a similar path toward the source. In other words, the incident rays and the reflected rays are substantially parallel to one another though in opposite directions. In some implementations of the invention, a surface is a retro-reflector if its reflected rays are reflected back within +/−15° from the incident rays.

Various implementations of the invention comprise a visually transparent film that can be "retro-fitted" on existing displays or other surfaces (e.g., notebooks, walls, white boards, tabletops, etc.) to provide an appropriate digital-human interface. In various implementations, the film may also function as a protective shield.

Various implementations of the invention comprise a film that is transparent to the visible spectrum (e.g., 380 nm to 700 nm) in the viewing angle of +/−75° to +/−110° to the normal defining the plane of the film. In some implementations of the invention, the film is reflective only to 405+/−10 nm band of radiation; and transmits the rest of the 380 nm-700 nm Band of radiation.

Figure 1:
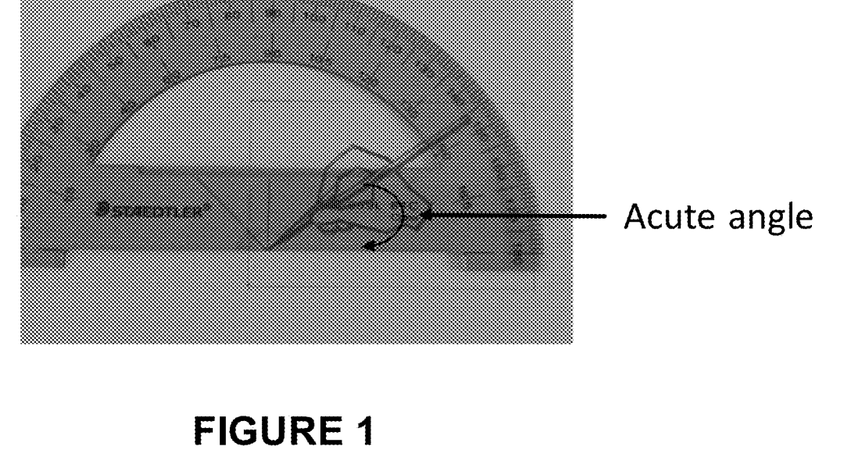
FIG. 1 illustrates a forearm-hand (palm) angle of a human hand according to various implementations of the invention.
Figure 2:
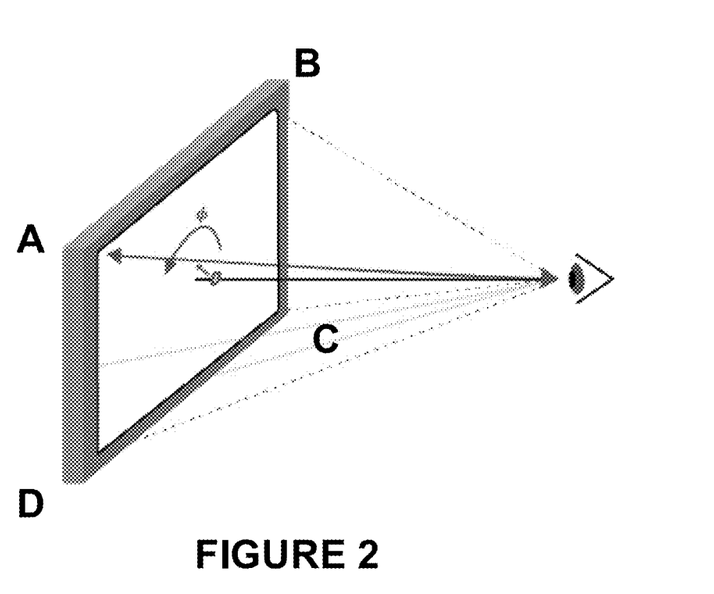
FIG. 2 illustrates a cone of vision of a human viewer according to various implementations of the invention.

Various implementations of the invention comprise a film that includes retro-reflective marks responsive to a pen having a light source at pen-to-surface (acute) angles of 30° to 60° (sometimes referred to herein as a handwriting angle) consistent with a forearm-hand (palm) angle of a human hand as illustrated in FIG. 1. In some of such implementations of the invention, such marks are transparent in the visible spectrum within the cone of vision of a human viewer, and as defined by ISO 13406-02, and as illustrated in FIG. 2, illustrated as a solid angle defined by the viewer eye and corners a,b,c,d of viewing frame.

Various implementations of the invention comprise a film including three-dimensional marks embodied therein, where the marks may be in the form of domes, spheres (or portions thereof), paraboloids, dimples, cones, or dents or other forms in various dimensions and shapes such that a surface of the marks retro-reflect at least a selected band of incident radiation at various handwriting angles.

Figure 3:
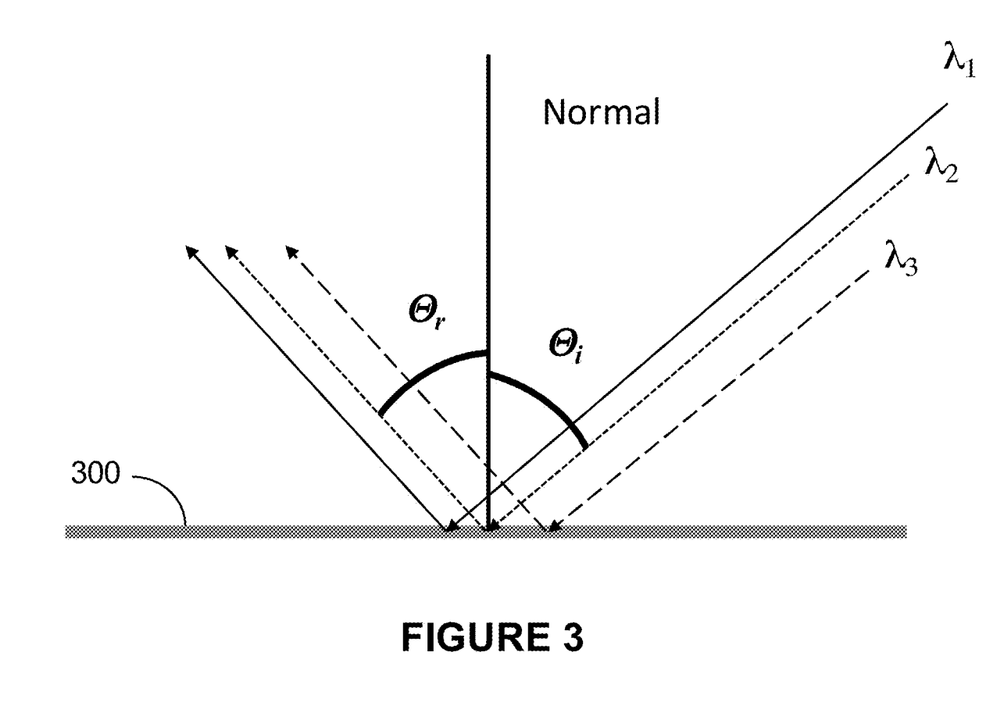
FIG. 3 illustrates a ray diagram of specular reflection for a common reflective surface.

FIG. 3 illustrates a ray diagram of specular reflection for a common reflective surface 300 such as aluminum foil or a mirror, where an angle of incidence, $\theta_i$, is equal to an angle of reflection, $\theta_r$, at all three wavelengths $\lambda_1$, $\lambda_2$, and $\lambda_3$. (For purposes of clarity, FIG. 3 specifically illustrates the angles only for $\lambda_2$.)

Figure 4:
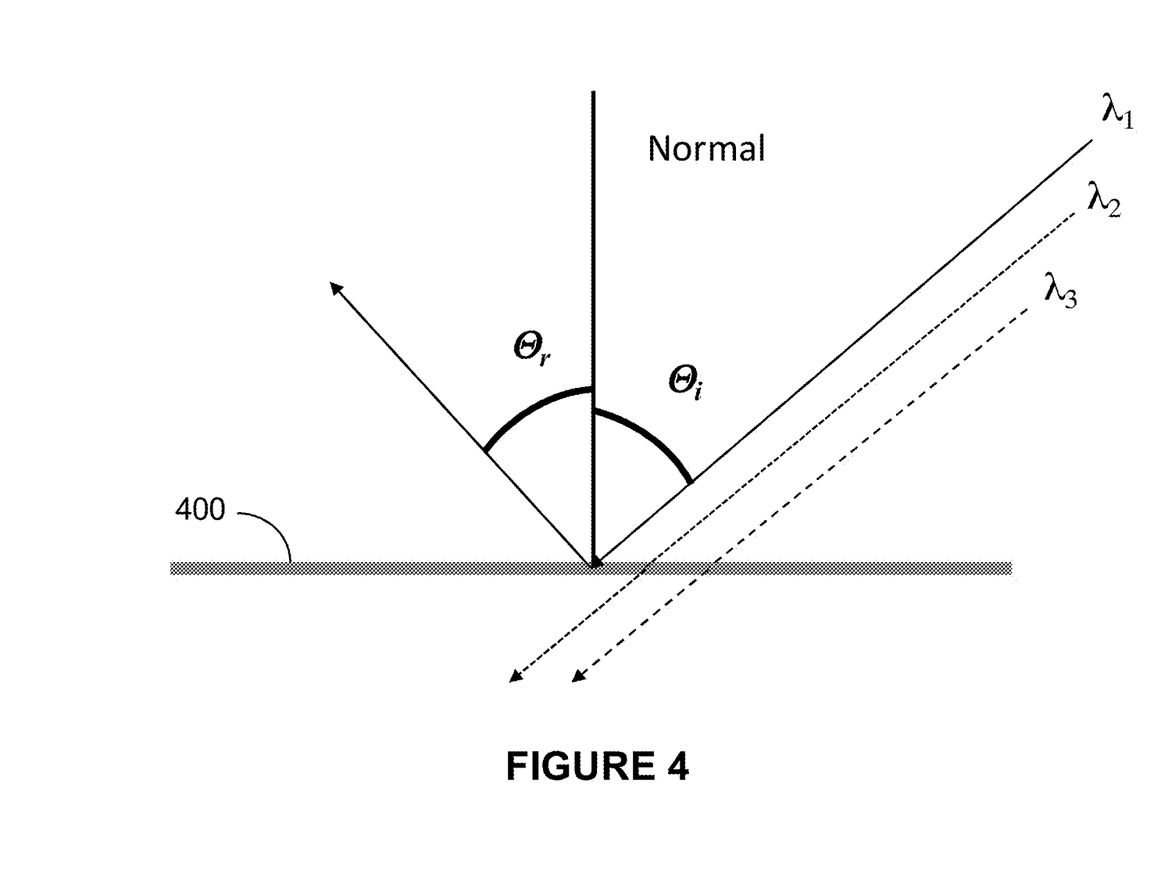
FIG. 4 illustrates a surface or film that selectively reflects a particular band of wavelengths of radiation, while allowing for passage of other wavelengths or radiation, according to various implementations of the invention.

FIG. 4 illustrates a film 400 that selectively reflects a particular band of wavelengths of radiation, while allowing for passage of (i.e., being transparent to) the other wavelengths or radiation, according to various implementations of the invention. More particularly, film 400 reflects radiation at wavelength $\lambda_1$, while film 400 is transparent to radiation at wavelengths $\lambda_2$ and $\lambda_3$. In some implementations of the invention, film 400 may be a multilayer film.

Figure 5A:
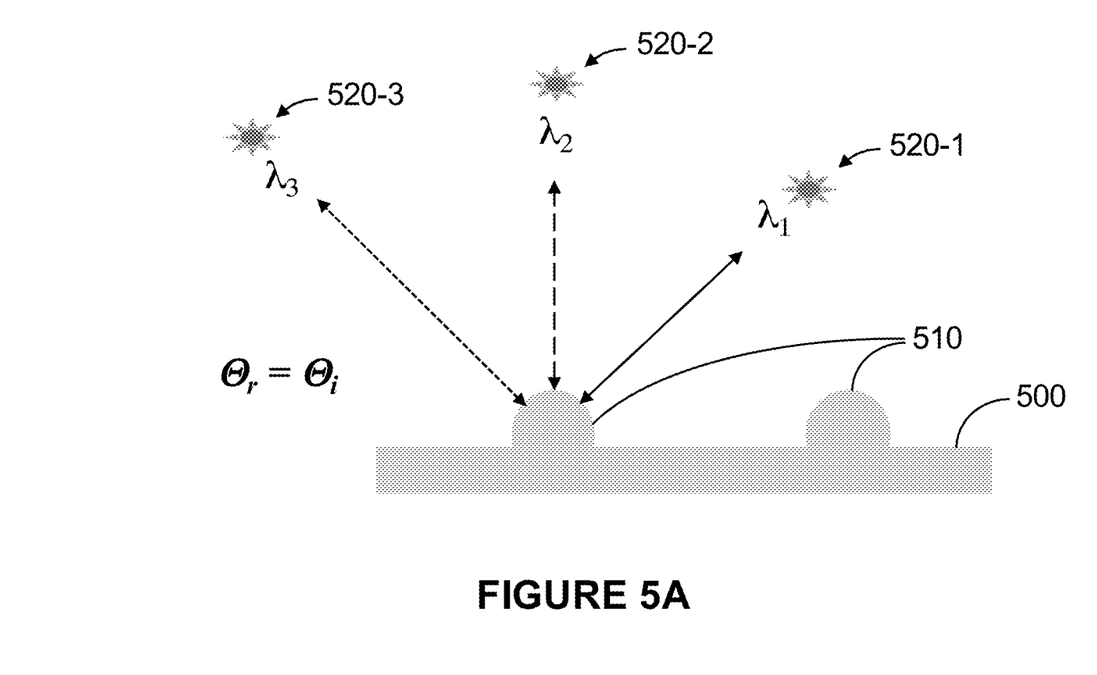
FIG. 5A illustrates three-dimensional structures of a surface or film retro-reflecting radiation from sources according to various implementations of the invention.

FIG. 5A illustrates an example of three-dimensional structures 510 (e.g., marks) of a film 500 retro-reflecting radiation from sources 520 due to a particular geometry of the three-dimensional structures according to various implementations of the invention. In case of these geometries, at least a portion of the reflected radiation is substantially parallel to the incident radiation, especially within the range of the angles of pen-to-surface interaction (i.e., handwriting angles). As illustrated, at least a selected band of incident radiation (e.g., all three wavelengths $\lambda_1$, $\lambda_2$, and $\lambda_3$) is reflected back to its respective source 520 along a same path (illustrated in FIG. 5A as a source 520-1 for wavelength $\lambda_1$, a source 520-2 for wavelength $\lambda_2$, and a source 520-3 for wavelength $\lambda_3$).

Figure 5B:
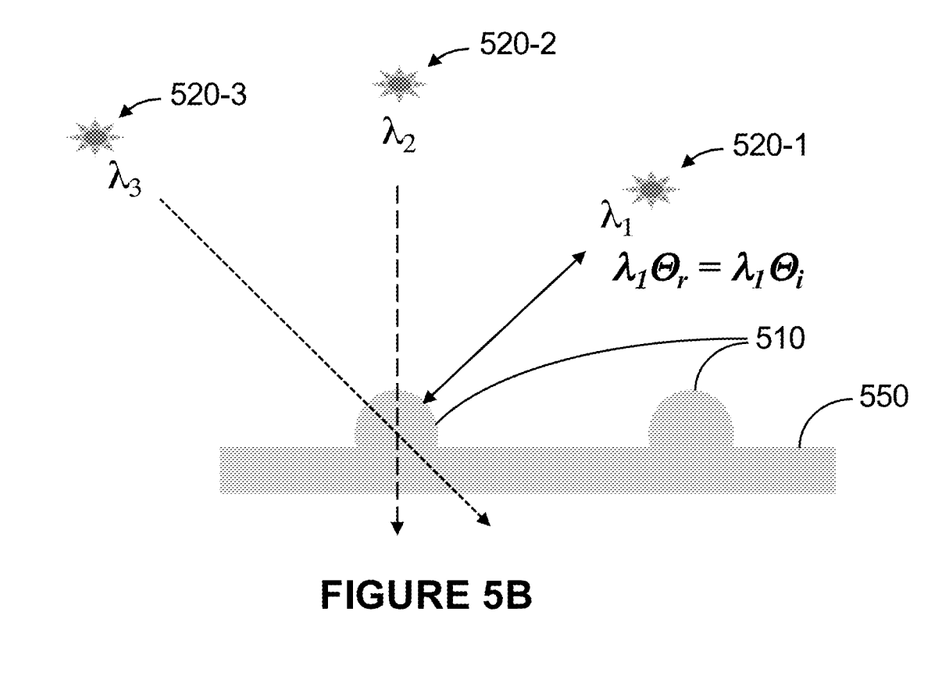
FIG. 5B illustrates three-dimensional structures of a surface or film selectively retro-reflecting one band of radiation from sources, while transmitting other bands of radiation according to various implementations of the invention.

FIG. 5B illustrates an example of the three-dimensional structures of a multilayered film 550 selectively retro-reflecting one band of radiation, while transmitting other bands of radiation, due to a particular geometry of the three-dimensional structures 510 and composition of film 550, according to various implementations of the invention. As illustrated, the incident light at wavelength $\lambda_1$ is retro-reflected (i.e., reflected back) to its source 520-1, whereas film 550 is transparent (i.e., little or no reflection) to radiation at wavelengths $\lambda_2$ or $\lambda_3$.

FIGS. 6A-6D illustrate various examples of three-dimensional structures 610 (e.g., marks) that may be used by various implementations of the invention. In some implementations of the invention, various shapes of structures 610 may be used to tailor the angle of apparent retro-reflection of radiation incident at various angles according to various implementations of the invention. According to various implementations of the invention, structures 610 reflect at least a selected band of incident light back in the general direction of source (not illustrated in FIGS. 6A-6D) of the light. In some implementations of the invention, the various shapes of structures 610 may be dictated based on manufacturing techniques or processes tolerated by films 600 themselves. In some implementations of the invention, three-dimensional structures 610 may be embodied on a surface of film 600. In some implementations of the invention, three-dimensional structures 610 may be formed as voids or hollowed-structures within film 600. In some implementations of the invention, three-dimensional structures 610 may be formed upwardly as illustrated in FIGS. 6A-6D (and elsewhere). In some implementations of the invention, three-dimensional structures 610 may be formed downwardly as would be appreciated. In some implementations of the invention, three-dimensional structures 610 may be formed from multilayered films. In some implementations of the invention, the wavelength selection may be due to multilayered film. In some implementations of the invention, the wavelength selection may be due to nano-structures in the film.

Figure 6A:
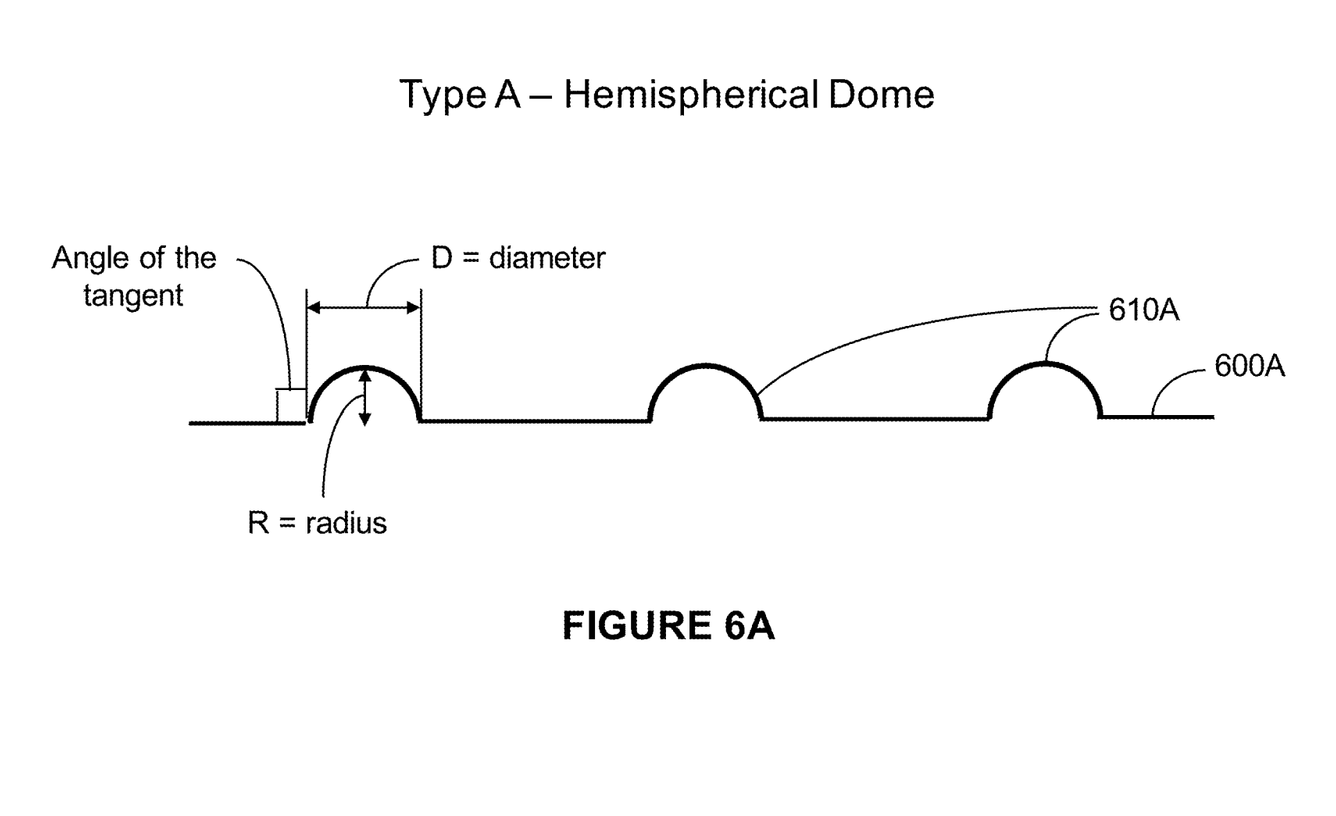
FIG. 6A illustrates three-dimensional structures having a hemispherical shape according to various implementations of the invention.

FIGS. 6A-6D illustrate cross sections of various three-dimensional structures 610 that may be embodied on or in films 600 of various implementations of the invention. FIG. 6A illustrates three-dimensional structures 610A (i.e., marks) as domes having a hemispherical shape according to various implementations of the invention. In such implementations, the marks are hemispherical, having a radius, R, as a distance between the highest point of the mark from the plane, which corresponds to one half of a diameter, D, of the dome; and where the tangent to the dome at the point of intersection with the plane (i.e., angle of the tangent) is 90°. In some implementations of the invention, the diameter, D, of the dome may be between 50 to 300 microns; in some implementations of the invention, the diameter, D, may be between 60 to 200 microns; in some implementations of the invention, the diameter, D, may be between 70 to 150 microns; and in some implementations of the invention, other diameters may be used as would be appreciated.

Figure 6B:
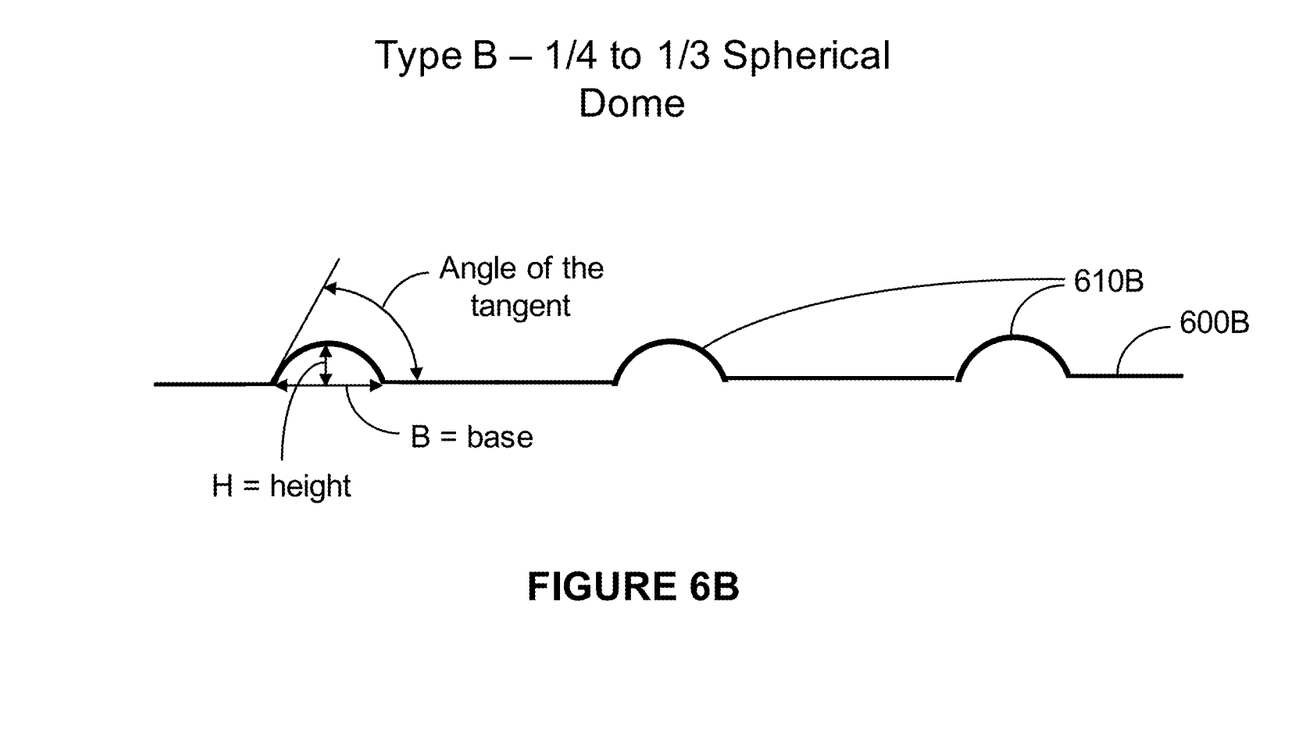
FIG. 6B illustrates three-dimensional structures having a partially spherical shape according to various implementations of the invention.

FIG. 6B illustrates three-dimensional structures 610B (i.e., marks) as ¼ to <½ domes having a partially rounded or partially spherically shaped according to various implementations of the invention. In such implementations, the marks are partially spherical, having a height, H, as a distance between the highest point of the mark from the plane, which roughly corresponds to one-third or one-quarter of a base, B; and the tangent to the surface at the point of intersection with the plane (i.e., acute angle of the tangent) is between 45° and 60°. In some implementations of the invention, the diameter of the base, B, of the dome may be between 50 to 300 microns; in some implementations of the invention, the diameter of the base, B, of the dome may be between 60 to 200 microns; in some implementations of the invention, the diameter of the base, B, of the dome may be between 70 to 150 microns; and in some implementations of the invention, other diameters of the base, B, may be used as would be appreciated.

Figure 6C:
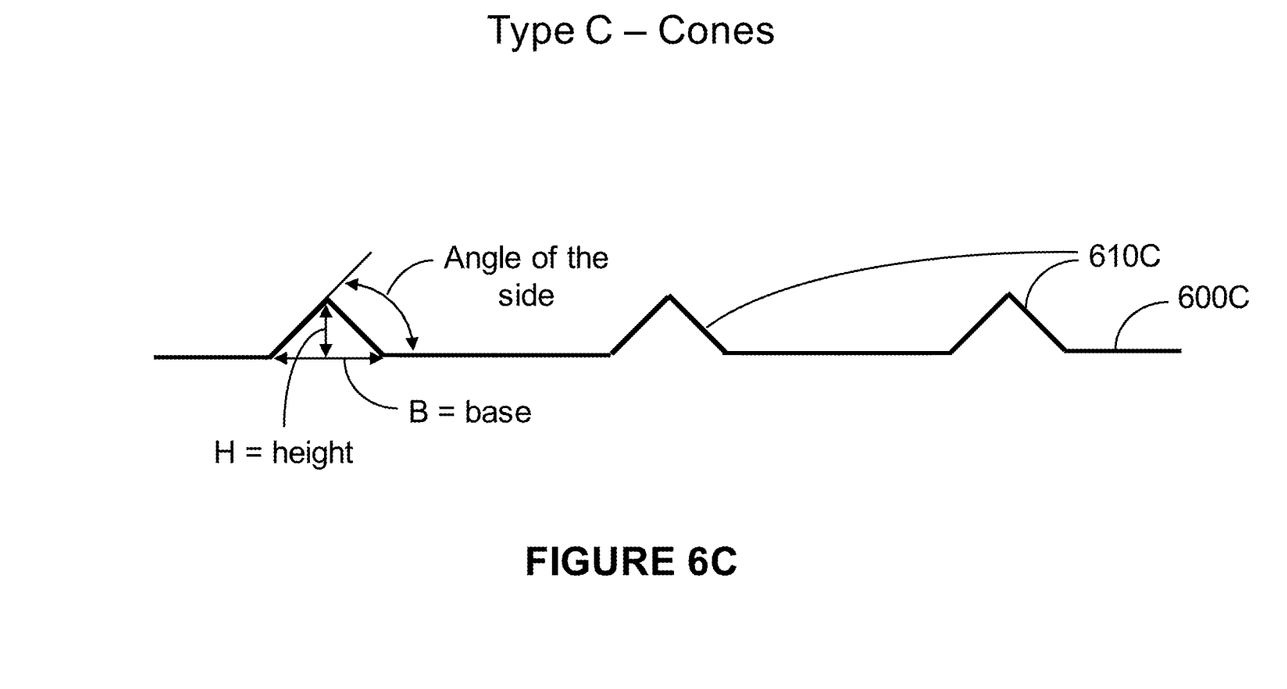
FIG. 6C illustrates three-dimensional structures having a conical shape according to various implementations of the invention.

FIG. 6C illustrates three-dimensional structures 610C (i.e., marks) having a conical shape according to various implementations of the invention. In such implementations, the marks may comprise a cone having a height, H, that is one-half to one-fourth of a measure of a base, B, (i.e., diameter of the base) of the cone. In some implementations of the invention, an angle of the sides of the cone relative to the plane (i.e., acute angle of the side) may be between 45° and 60°. In some implementations of the invention, the diameter of the base, B, of the cone may be between 50 to 300 microns; in some implementations of the invention, the diameter of the base, B, of the dome may be between 60 to 200 microns; in some implementations of the invention, the diameter of the base, B, of the cone may be between 70 to 150 microns; and in some implementations of the invention, other diameters of the base, B, may be used as would be appreciated.

Figure 6D:
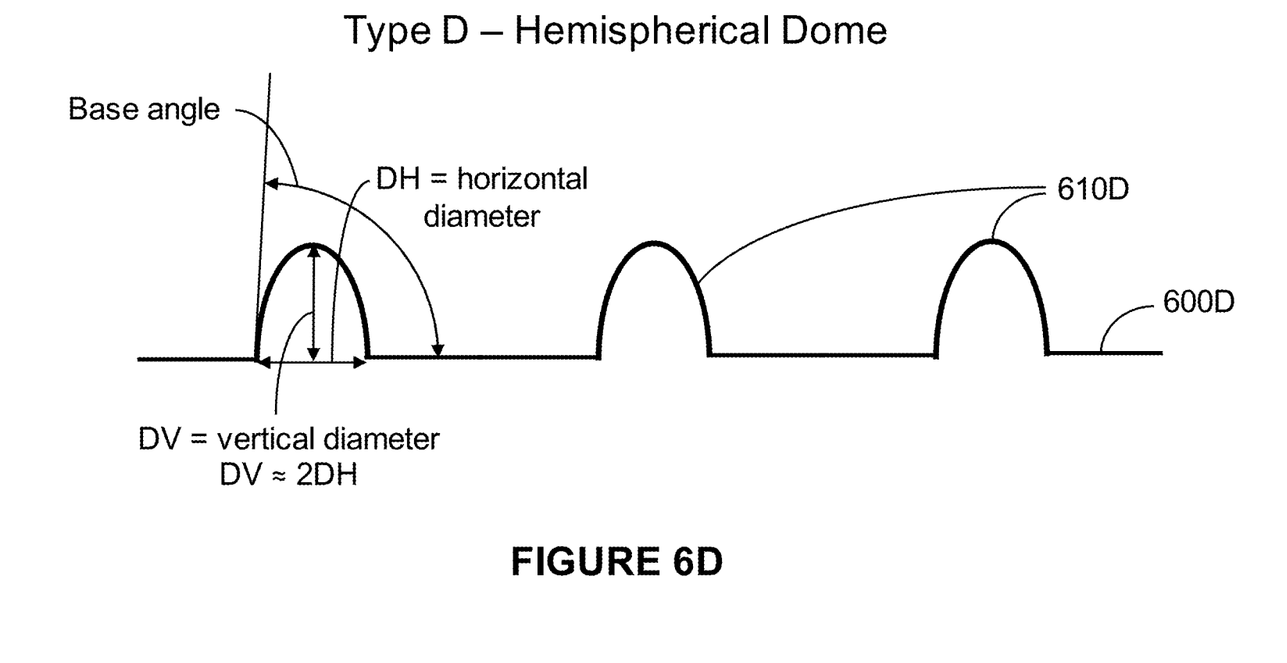
FIG. 6D illustrates three-dimensional structures having an oblong dome shape according to various implementations of the invention.

FIG. 6D illustrates three-dimensional structures 610D (i.e., marks) having an oblong dome shape having a ratio of a vertical diameter, DV, to a horizontal diameter, DH, of between 3:1 to 1.1:1 according to various implementations of the invention. In such implementations, the marks are egg-shaped, appearing as parabolas in cross-section. In some implementations of the invention, the base (acute) angle of the egg walls with the plane is between 45° and 60°. In some implementations of the invention, the horizontal diameter of the egg is between 50 to 300 microns; in some implementations of the invention, the horizontal diameter of the egg is between 60 to 200 microns; and in some implementations of the invention, the horizontal diameter of the egg is between 70 to 150 microns.

In some implementations of the invention, the wavelength selection referred to herein may be accomplished using a multilayered film. In some implementations of invention, the three dimensional marks are formed in multilayered films that may be selectively reflective in 405+/−10 nm or NIR bands, and have high transmission in rest of the visible band. In some implementations of invention, the three dimensional marks are formed in multilayered films that may be selectively reflective in 850+/−10 nm or NIR bands, and have high transmission in visible band. Wavelength selective reflectors, which include multilayer interference films, alternate a layer of material having a high index of refraction with a layer of material having a low index of refraction, as would be appreciated. In reflectors of this type, each layer has a thickness of one-quarter of the wavelength of a predetermined color of light; the low index layers tend to reduce reflection of wavelengths selected for transmission by the film, while the high index layers increase reflection of desired wave bands by the film. Such reflectors, as a whole, provide wavelength selective characteristics by transmitting a substantial proportion of light of one waveband, while reflecting a substantial proportion of light of another waveband. For example U.S. Pat. No. 5,233,465, which is incorporated herein by reference describes films made from polymer layers selective in reflectance and transmittance to selected wavebands. Commercially available multilayered films which may be used in various implementations of this invention include Crystalline 90, available from 3M Corporation, St. Paul, Minn., USA. Other films that utilize nanostructures including silver nano-particles may also be used as would be appreciated.

Various implementations of the invention combine the wavelength selectivity of the multilayer materials with the retro-reflector geometry of the three dimensional structures to create marks transparent to visible wave bands, while being reflective to NIR or 405+/−10 nm wave band.

Various implementations of the invention provide for digital tracking (i.e., identification of the marks embodied within the film) without interfering with human vision. As such, in some implementations of the invention, any of the films described above may comprise a multilayer film that may be, for example, reflective in the near infrared spectrum and transparent in the visible spectrum. Various LED light sources emit radiation in the 780 nm to 900 nm (i.e., near infrared "NIR" range) or 280 nm to 550 nm (UV/VIS) LED. Such LED light sources may be detected by photosensitive cameras equipped with near infrared band pass filters to filter all light, except for the light from an NIR LED source. In some implementations of the invention, the NIR LED source emits radiation in the 850 nm+/−15 nm wave band. In some implementations of the invention, the UV/VIS LED source emits radiation in the 405 nm+/−10 nm wave band.

According to various implementations of the invention, the films and the three-dimensional structures therein may be prepared by a variety of techniques. Some implementations of the invention employ multilayer films that are transparent to the visible spectrum, but reflect NIR radiation. Such films, which are widely available from 3M, Dupont-Tenjin, Llamar, etc., are used as home and automobile window treatments to filter sunlight. According to various implementations of the invention, the three-dimensional structures may be micro-imprinted or embossed in these films.

Some implementations of the invention employ multilayered IR reflective films, commercially available from a variety of sources to create marks that may selectively reflect wavelengths in accordance with various implementations of the invention.

In some implementations of the invention, the three-dimensional structures may be created via deposition of the film material(s) onto a substrate having the desired geometry as would be appreciated. In some implementations of the invention, the three-dimensional structures may be created by etching such structures having the desired geometry out of the film material(s) as would be appreciated. In some implementations of the invention, the three-dimensional structures may be created via a three-dimensional printer that prints such structures onto a surface. In some implementations of the invention, pre-prepared multi-layered microspheres (or other relevant geometry) may be deposited on the surfaces, pre-printed with an adhesive in the mark areas, followed by further curing to permanently attach the microspheres to the surface. In some implementations of the invention, the three-dimensional structures may be embossed or punched into the film material(s) as would be appreciated.

In some implementations of the invention, the marks may be created on materials such as plastic or glass surfaces for display applications. In implementations of the invention not requiring transparent films such as white board, or writing pads, the marks may be created in films such as aluminum foil, which is neutral to human vision.

In some implementations of the invention, the patterns for the marks may be in any digitally formatted pattern, such those commonly referred to as Anoto patterns, and available from Anoto, Inc., of Westborough, Mass. Such patterns enable a stylus or pen to determine a precise location of the tip of the stylus or pen on the paper or screen as would be appreciated. Other patterns may be utilized as would be appreciated.

In some implementations of the invention, a digital reading device for detecting and digitizing the marks comprises a stylus or a pen, such as AnotoPen, also available from Anoto, Inc., which is held at the forearm-hand (palm) angle while in human use. Such pens have a radiation source (e.g., light source) and a camera positioned inside in a manner such that the light reflected from the marks may be sensed by the camera at typical handwriting angles and be digitally recorded by the pen or stylus in communication with an electronic device such as a computer, tablet, phone, and a PDA.

Figure 7:
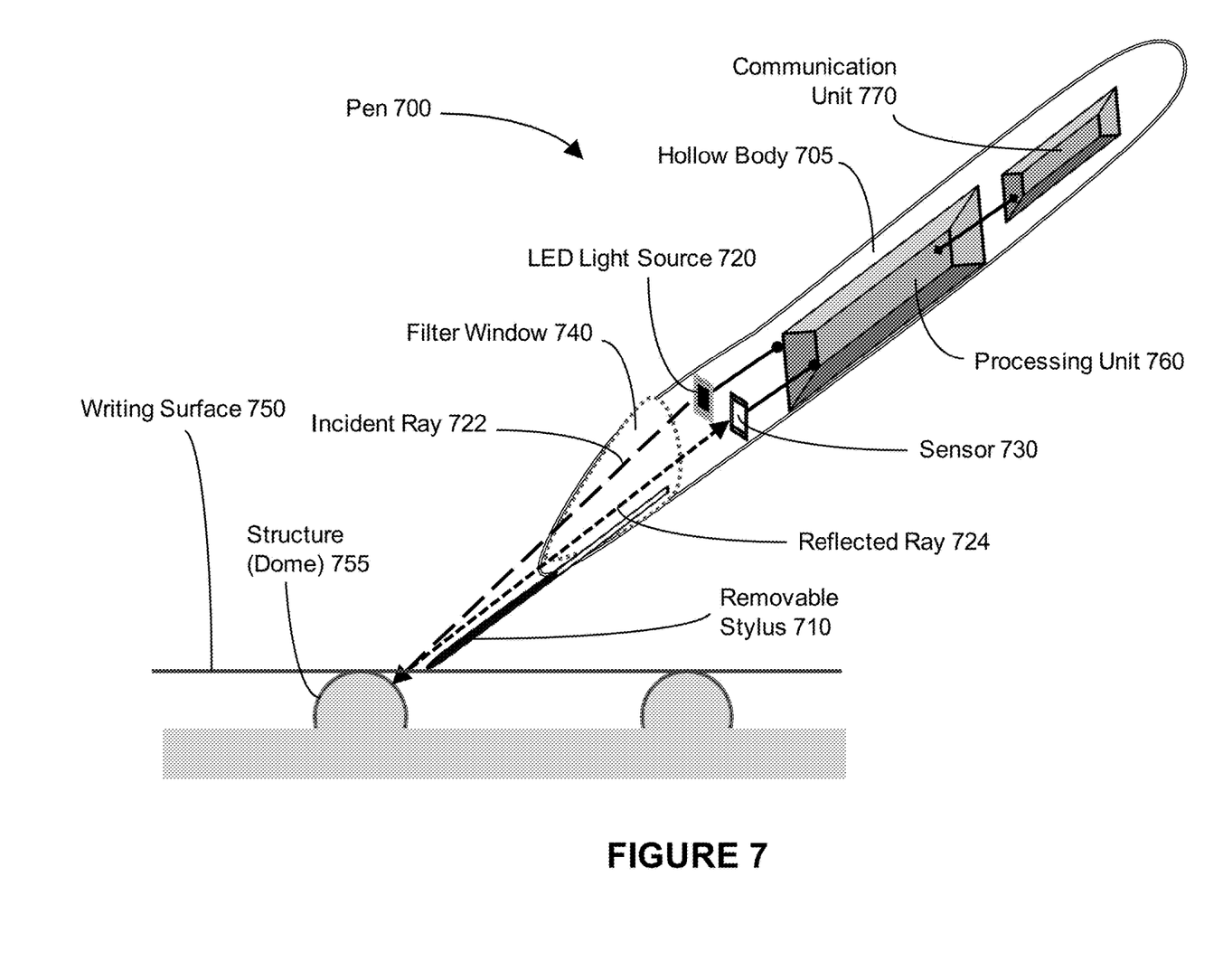
FIG. 7 illustrates a digital reading device which may be used with various implementations of the invention.

In some implementations of the invention, a digital reading device, or pen, 700, such as that illustrated in FIG. 7, includes of a cylindrical hollow body 705 configured for good writing grip. In some implementations of the invention, pen 700 has a removable blunt end pointer, or stylus, 710 configured to imitate writing action. In some implementations of the invention, pen 700 is equipped with an LED light source 720 that emits an incident ray 722 having a wavelength outside the human visible range and configured to produce reflections from the marks as a reflected ray 724. In some implementations of the invention, pen 700 is also equipped with a sensor 730 to receive and detect reflected ray 724 and produce an electronic signal. LED light source 720 and sensor 730 are positioned to direct light to and receive light from writing surface 750, and three-dimensional structures 755 therein (illustrated, but not limited to "domes") in accordance with various implementations of the invention. In some implementations of the invention the structures 755 are multilayered films. In some implementations of the invention, LED light source 720 and sensor 730 transmit and receive the light of desired wavelength through a filter window 740. Sensor 730 is configured to detect retro-reflected ray 724 while being small enough to be integrated in pen 700. In some implementations of the invention, an angle between incident ray 722 and reflected ray 724 may be 15° or less, though other angles may be accommodated as would be appreciated. In some implementations of the invention, the electronic signal from sensor 730 is fed in to a digital processing unit 760 that is in wired or wireless communication with digital communication unit 770, which in turn is in communication with an electronic device such as a computer, PDA, phone, kindle, e-ink reader, i-pad, or other electronic device (not otherwise illustrated in FIG. 7) as would be appreciated.

In various implementations of the invention, the films and marks therein are a 'stand alone' surface for the tracking and detecting the human interaction with the film. According to various implementations of the invention, the films may be integrated with surfaces associated with a digital device. For example, the film of the invention may be affixed or otherwise overlaid onto a digital LED or LCD display of a computer or handheld device including mobile devices. Also for example, the film of the invention may also serve as a protective shield for the digital LED or LCD display in a manner similar to those shields provided with various protective covers manufactured by, for example, Otter Box, etc. Also for example, the film of the invention may be attached over a white board or note pad. Also for example, the film of the invention may be integrated with a heads-up-display, for example, of an airplane, automobile, etc. Also for example, the film of the invention may be included in laptop privacy screens, which are attached over the display screens. Also for example, the film of the invention may be attached over e-Reader devices, such as Kindle, etc., and used for tracking and marking customized text highlights, etc.

In some implementations of the invention, an operation of reading a mark comprises: 1) sending light pulses towards marks on the film; 2) record retro-reflected light pulses reflected from various marks on the film; 3) record the retro-reflected pulses, their locations based on the marks, and their time; and 4) track the respective positions and motion of the pen based on the retro-reflected pulses.

EXAMPLE

Figure 8A:
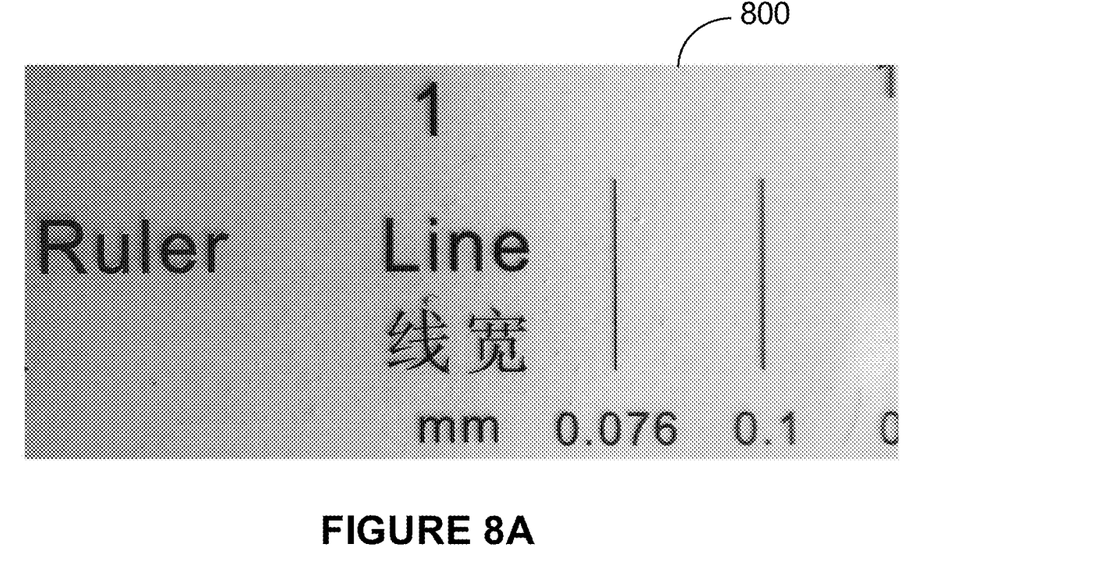
FIG. 8A illustrates an example of a film patterned with three dimensional structures illuminated by light in the visual spectrum in accordance with various implementations of the invention.
Figure 8B:
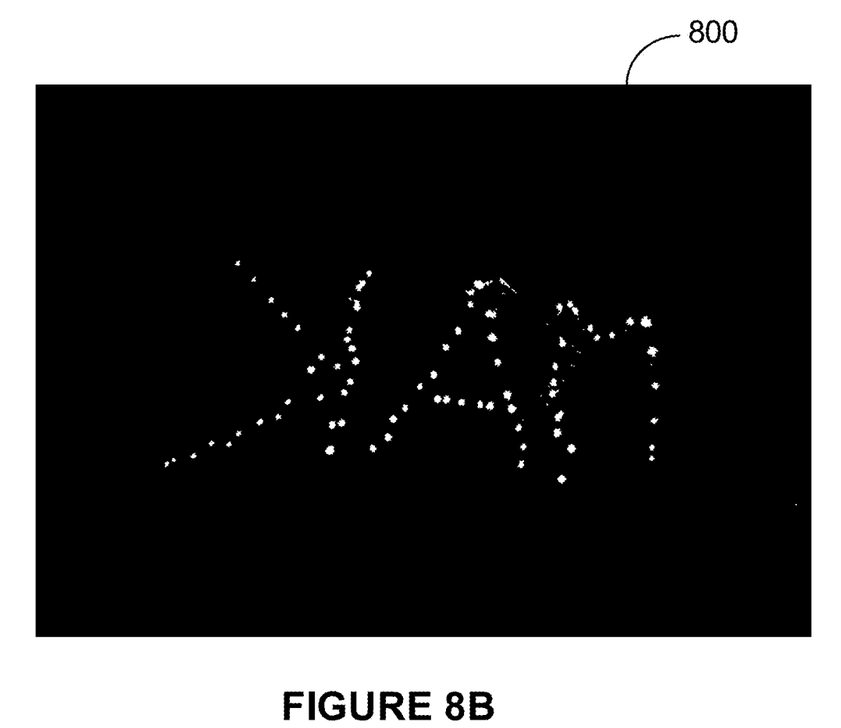
FIG. 8B illustrates the example of the film patterned with three dimensional structures illuminated by light at 850 nm in accordance with various implementations of the invention.

A 3"×2" piece of commercial automotive film from 3M, referred to as CR-90, with VLT>88% and MR reflectance of >80%, was mounted on a hard board with paper clips. A One Touch Delica 33 gauge (0.02096 micron) lancet manufactured by LifeScan, Inc, Milpitas, Calif., was used to create deformations (e.g., marks) in the film by applying enough pressure to cause an indentation, but not penetrate the film. The indentation pattern was of the inventor's name ("MAK") and observed form the opposite side. The domes thus created in the patterned film were observed through digital microscope with visual light at about an angle of 45°, and then with digital microscope equipped with a visual light cutoff filter and an 850 nm light source. The visual light did not show any perceptible visible interference with the background, while the 850 nm photographs showed clear bright pattern. FIG. 8A illustrates a patterned film 800 illuminated with light in the visual spectrum; while FIG. 8B illustrates the patterned film 800 illuminated with light at 850 nm.

The invention claimed is:

1. A film comprising:
   a writing surface; and
   a wavelength selective film adjacent to and substantially parallel with the writing surface, wherein the wavelength selective film is reflective for infrared or near-infrared radiation and transparent for visible radiation, wherein the wavelength selective film forms a plurality of three-dimensional structures embodied on or within the wavelength selective film, each of the plurality of three-dimensional structures having a reflecting surface configured to retro-reflect infrared or near-infrared radiation from a radiation source back to a detector located at the radiation source, wherein the reflecting surface is configured to retro-reflect infrared or near-infrared radiation when an angle between the infrared or near-infrared radiation from the radiation source and the writing surface is between 30 and 60 degrees and wherein an angle between the radiation from the radiation source incident to the reflecting surface and radiation reflected from the reflecting surface is between +/−15 degrees.

2. The film of claim 1, wherein each of the plurality of three-dimensional structures comprises a hemispherical or partially hemispherical structure.

3. The film of claim 1, wherein each of the plurality of three-dimensional structures comprises a conical structure.

4. The film of claim 1, wherein each of the plurality of three-dimensional structures comprises a parabolic structure.

5. The film of claim 1, wherein the wavelength selective film comprises a reflective multi-layered film forming the reflective surface of each of the plurality of three-dimensional structures.

6. The film of claim 1, wherein the plurality of three-dimensional structures are embossed into the wavelength selective film.

7. The film of claim 1, wherein the plurality of three-dimensional structures are formed in a digital tracking pattern configured to provide a precise location within the pattern.

8. A surface comprising:
   a wavelength selective material reflective for infrared or near-infrared radiation and transparent for visible radiation, wherein the wavelength selective material forms a plurality of three-dimensional structures embodied on or within the surface, each of the plurality of three-dimensional structures having a reflecting surface configured to retro-reflect infrared or near-infrared radiation from a radiation source back to a detector located at the radiation source, wherein the reflecting surface is configured to retro-reflect infrared or near-infrared radiation when an angle between the infrared or near-infrared radiation from the radiation source and the surface is between 30 and 60 degrees and wherein an angle between the radiation from the radiation source incident to the reflecting surface and radiation reflected from the reflecting surface is between +/−15 degrees.

9. The surface of claim 8, further comprising a display.

10. The surface of claim 9, wherein the writing surface is incorporated into a viewing surface of the display.

11. The surface of claim 8, wherein each of the plurality of three-dimensional structures comprises a hemispherical structure, a partial hemispherical structure, a conical structure or a parabolic structure.

12. The surface of claim 8, wherein the plurality of three-dimensional structures are embossed into the surface.

13. The surface of claim 8, wherein the plurality of three-dimensional structures are formed in a digital tracking pattern configured to provide a precise location within the pattern.

14. An article of manufacture comprising:
   a protective cover configured to substantially cover a handheld electronic device, wherein the electronic device includes an integral display, the protective cover having an opening configured to permit viewing of the integral display; and
   a wavelength selective film configured to be disposed adjacent to and in contact with the integral display of the electronic device, wherein the wavelength selective film is reflective for infrared or near-infrared radiation and transparent for visible radiation, wherein the wavelength selective film forms a plurality of a three-dimensional structures embodied on or within the wavelength selective film, each of the plurality of three-dimensional structures having a reflecting surface configured to retro-reflect infrared or near-infrared radiation from a radiation source back to a detector located at the radiation source, wherein the reflecting surface is configured to retro-reflect infrared or near-infrared radiation when an angle between the infrared or near-infrared radiation from the radiation source and the wavelength selective film is between 30 and 60 degrees, wherein an angle between the radiation from the radiation source incident to the reflecting surface and radiation reflected from the reflecting surface is between +/−15 degrees, and wherein the film is transparent to visible radiation emitted from the display.

15. The article of manufacture of claim 14, wherein each of the plurality of three-dimensional structures comprises a hemispherical structure, a partially hemispherical structure, a parabolic structure, or a conical structure.

16. The article of manufacture of claim 14, wherein the plurality of three-dimensional structures are formed from and embossed into the wavelength selective film.

17. The article of manufacture of claim 14, wherein the plurality of three-dimensional structures are formed in a digital tracking pattern configured to provide a precise location within the pattern.

18. The film of claim 1, wherein the film is transparent to visible radiation such that visible radiation originating from one side of the film transmits through to another side of the film.

19. The film of claim 1, wherein each of the plurality of three-dimensional structures is transparent to visible radiation.

20. The surface of claim 8, wherein each of the plurality of three-dimensional structures is transparent to visible radiation.

\* \* \* \* \*